Oct. 11, 1966  A. PITNER  3,277,988
CLUTCH HAVING THRUST BEARING OPERATED THROUGH A UNIVERSAL JOINT
Filed May 4 1965
3 Sheets-Sheet 1
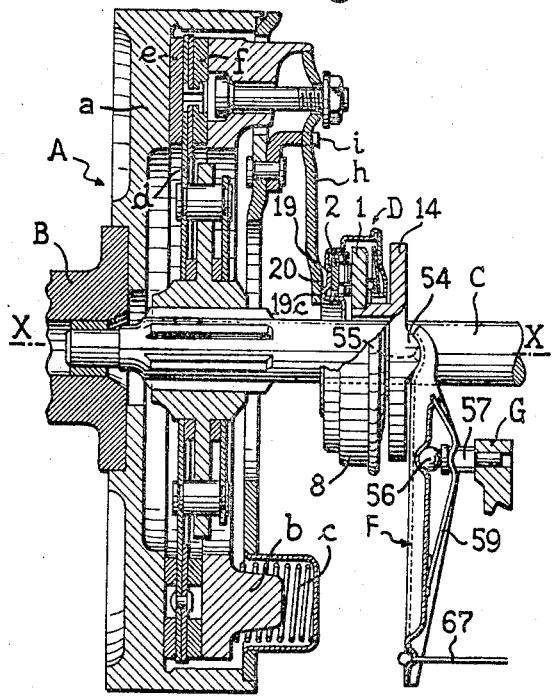
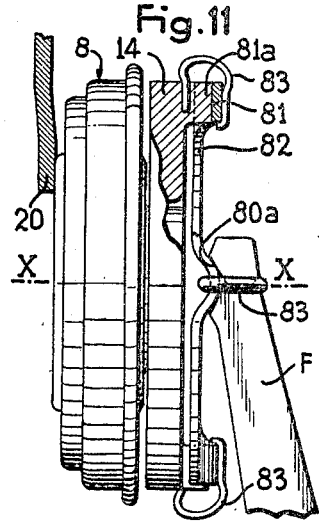
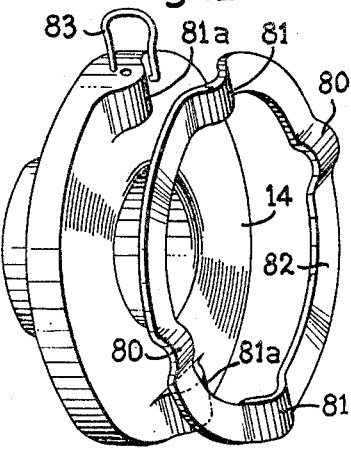

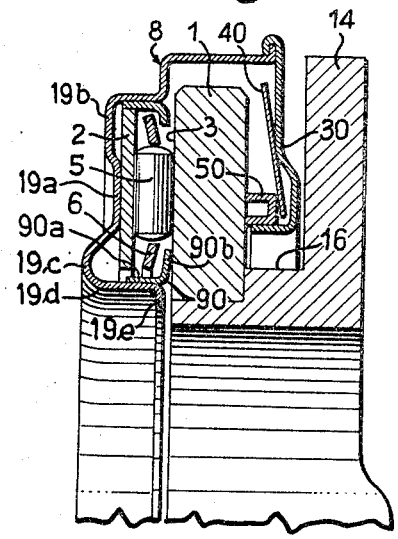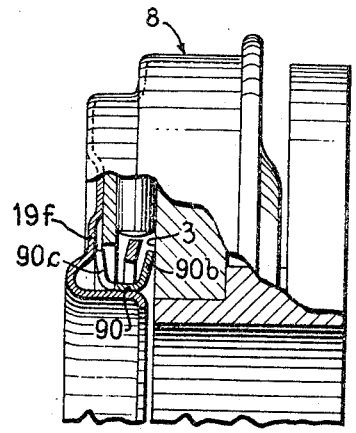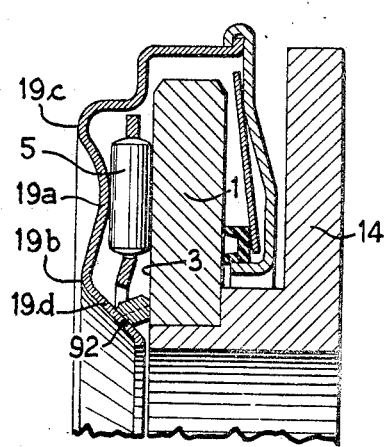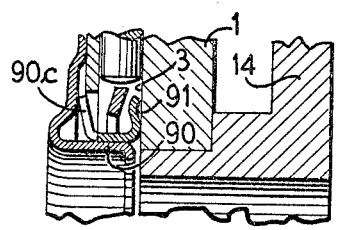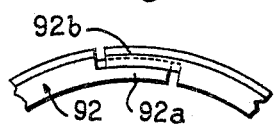

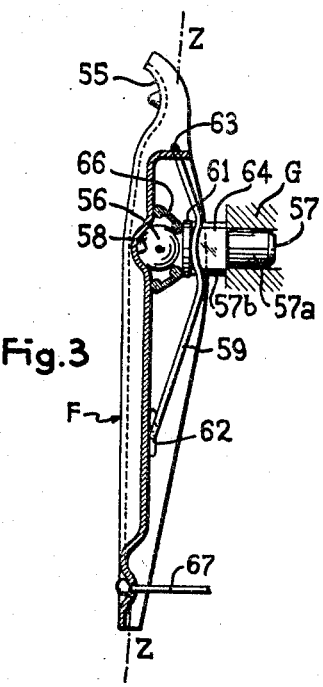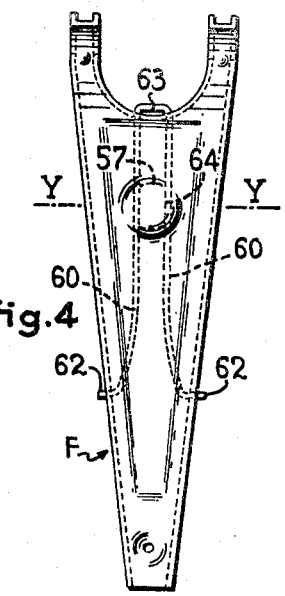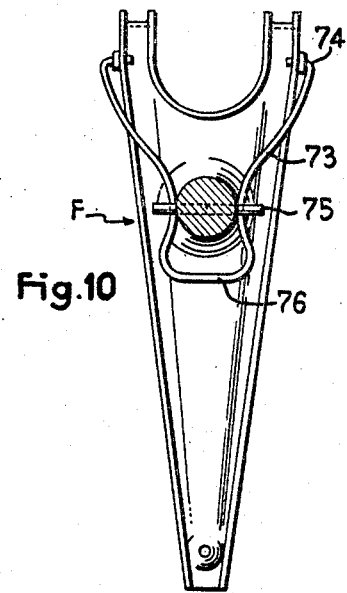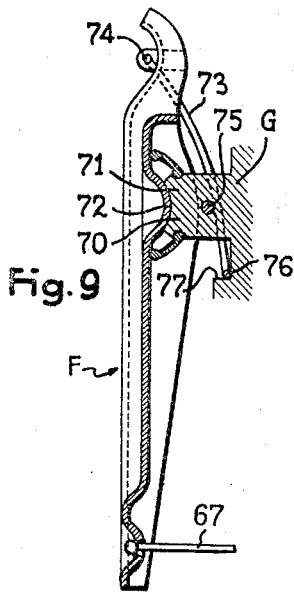

3,277,988
CLUTCH HAVING THRUST BEARING OPERATED THROUGH A UNIVERSAL JOINT
Alfred Pitner, Paris, France, assignor of one-half to Nadella S.A., Rueil-Malmaison, Seine-et-Oise, France, a corporation of France
Filed May 4, 1965, Ser. No. 453,029
Claims priority, application France, May 14, 1964, 974,476; July 23, 1964, 982,745
9 Claims. (Cl. 192—98)

The present invention relates to clutch systems for in particular motor vehicles in which the clutch thrust bearing comprises moving elements of generally cylindrical shape interposed between two rolling plates which are free to move relatively to a given extent in the radial direction.

The thrust bearing D is broadly in conformity with the disclosure of the patent application filed by the applicants in United States on September 1st, 1964 under Serial Number 393,595 for: "Improvements in and Relating to Thrust Bearings."

As soon as the thrust bearing must transmit a load to effect a declutching operation, that is, when the moving elements are urged against their races, this bearing immediately becomes centered and remains centered even when the support of the bearing travels through a path which is not parallel to the axis of rotation but is inclined or curved. It is due to the possibility of radial displacement of a part of the bearing forming a race relative to the other part forming the other race which, owing to the self-centering effect, permits the existence of such a displacement in operation (thus avoiding any heating and any additional friction).

When the bearing is supported by a control means, such as a pivotal fork, which does not insure a rectilinear displacement thereof along the axis of rotation of the clutch assembly, it has been proposed—when either smooth thrust bearings or antifriction thrust bearings are employed that do not afford a radial freedom within the thrust bearing system such as mentioned hereinbefore—to provide between the thrust bearing and the levers or the diaphragm of the clutch mechanism an additional member known as a "plate" which is substantially centered by a mechanical means and on which the thrust bearing bears when declutching. The thrust bearing cannot only rub in a circular direction on this plate but also undergo a radial displacement or an offsetting with a force which, in the course of this displacement, creates substantial friction owing to the opposing tension applied to the declutching levers or diaphragm so as to maintain the friction surfaces in contact with one another. Further, owing to slight play in the assembly, this plate, when it is displaced so as to declutch, undergoes a slight angular or offsetting movement which creates on the levers or on the diaphragm parasitic rubbings which very often result in the progressive destruction of the surfaces of contact between the plate and the levers or diaphragm.

The additional mechanical member or plate which is held centered so as to avoid destruction of the levers or diaphragm in the case of a direct contact between the thrust bearing and these members, itself constitutes a space-consuming element of costly construction.

According to the invention, a surface of the thrust bearing which is fixed to or is part of the same material as one of the races of the bearing is so arranged as to act directly on the declutching elements, such as levers or a diaphragm.

Clutch systems in which the plate and its support are eliminated are in fact known, but the thrust bearings employed in these systems are mounted and maintained centered and consequently when actuated, move in an exclusively rectilinear path parallel to the axis of rotation which results in the engagement and disengagement of the clutch, so that there is no movement component perpendicular to this direction which, bearing in mind the friction which would result under the effect of the rather high thrusts ranging from 80 to 160 kg. and beyond, would result in rapid destruction. These known solutions comprise, for example, a ball bearing which is guided in a precise manner in the course of its displacement on a tubular element which is itself centered in a rather precise manner on the axis of rotation. To declutch, this centered bearing transmits the force in a purely longitudinal path.

The object of the present invention is to avoid the aforementioned drawbacks by eliminating the additional member known as a plate, and in particular to provide a clutch thrust bearing which is particularly cheap and has a small overall axial size—a particularly desirable feature in modern constructions.

The invention also permits dispensing with the precision guiding afforded by an additional tubular element at the present time employed in ball bearing assemblies. Further, owing to the elimination of this central guiding element, the diameter of the thrust bearing can be substantially decreased, since it has now only to surround one element of a certain volume. Apart from the distinct improvement in the overall axial size, a further benefit is also obtained in that the overall radial size is substantially reduced, with consequential reduction in weight and price.

In the clutch system according to the invention the thrust bearing having moving elements affording the aforementioned self-centering, comprises a housing containing the lubricant and acts on the levers or on the diaphragm either directly through the medium of a portion of the housing or through an element connected thereto which permits—as soon as the first contacts occur and notwithstanding the nonrectilinear or oblique movement to which the thrust bearing assembly, which is fixed in a control lever or fork, is subjected—immediately centering the rotating surfaces forming part of the bearing substantially relative to the axis of rotation of the clutch. As this centering occurs instantaneously, that is, as soon as contact occurs and therefore at low load, it cannot result in any fatigue in the levers or diaphragm. When the movement is continued and the action is accompanied with increasing and considerable force to separate the friction elements of the clutch, there is no longer friction between said surfaces since the rotating part of the bearing remains centered and it is within the bearing that the displacement in the radial direction occurs between the moving elements and at least one of the rolling surfaces or races therefor. As it concerns an inside well-greased part of the bearing, and above all as this displacement occurs in rotation together with a very rapid circular movement of the moving elements, it does not concern a purely radial but a spiral displacement. Consequently, the friction opposing the radial displacement becomes a very small and negligible fraction of what it was and consequently cannot subject to fatigue the pivotal mountings of the levers of the aforementioned clutch system or above all the diaphragm in the case where such a device is employed, since the bearing surface forming part of the clutch thrust bearing, once it is centered right at the start of the declutching movement and under very low load, subsequently remains in principle stationary relative to the diaphragm or to the levers and there is no longer substantial friction on these clutch elements. This relative immobility between the declutching elements and the coacting bearing surface of the thrust bearing is furthermore facilitated by a uniformity in the contact between these coacting elements. Such is not the case when the control fork is connected to the support by a pivot pin and itself supports the thrust bearing through the medium of a pivot pin and these pins are not or do not remain strictly parallel, or when one and/or the other of these pins is not parallel to a plane perpendicular to the axis of rotation of the clutch. This relatively frequent drawback of a lack of parallelism results in very slight impulses on the declutching elements, such as levers or diaphragms, which in some cases generate harmful cyclic stresses.

In order to remedy this drawback, that is, to compensate the slight angular movements of the bearing surface of the thrust bearing which are the consequence thereof, the clutch system comprises, in accordance with another feature of the invention, means for imparting a certain freedom of orientation of this bearing surface and consequently to the thrust bearing assembly about an axis which is approximately parallel to the general direction of the control fork.

This additional pivot axis can be embodied either by providing a swivel joint in the mounting of the fork on the support and means preventing any angular movement of the fork about an axis parallel to the axis of the clutch, or by interposing between the thrust bearing support and the fork, which is mounted on the support by means of a pivot pin, a mounting constituting a universal joint which has two pivot axes one of which is parallel to the axis of the pivotal mounting of the fork, while the other is perpendicular to the last-mentioned axis and approximately parallel to the general direction of the fork.

Clutch forks having a swivel mounting are known but solely in the case where the thrust bearing is centered and guided mechanically (the drawbacks of which have been pointed out hereinbefore), namely when a guide sleeve interposed between the two branches of the fork eliminates any freedom of movement about an axis parallel to the axis of rotation of the clutch.

The arrangements having two pivot axes just described are advantageously completed by retaining means which limit, by friction or in a resilient manner, the amplitude of the angular movements about the axis parallel to the direction of the fork.

Further features and advantages of the invention will be apparent from the ensuing description with reference to the accompanying drawings to which the invention is in no way limited.

In the drawings:

FIG. 1 is a longitudinal sectional view of a clutch system according to the invention;

FIG. 2 is partial sectional view, on an enlarged scale, of the thrust bearing of the clutch system shown in FIG. 1;

FIGS. 3 and 4 are elevational and sectional views respectively, on an enlarged scale, of the clutch system control fork for the clutch shown in FIG. 1;

FIGS. 5–7 are partial sectional views of variants of the thrust bearing shown in FIG. 2;

FIG. 8 is a partial elevational view of the sealing ring shown in FIG. 7;

FIGS. 9 and 10 are views similar to FIGS. 3 and 4 of a variant of the control fork;

FIG. 11 is a view of a thrust bearing mounted as a universal joint on a control fork, and FIG. 12 is a perspective view of an assembly constituting a universal joint for the thrust bearing shown in FIG. 11 and the coacting thrust bearing support.

The clutch system shown in FIGS. 1–4 comprises a clutch mechanism A whose main parts are of conventional type adapted to connect in a separable manner a driving shaft B to a driven shaft C.

The mechanism A comprises a plate $a$ connected to the driving shaft B and an annular counterplate $b$ biased by springs $c$ whereby a disc $d$, which is fixed to the driven shaft C, is clamped between friction elements $e$ and $f$ connected to the plate $a$ and the counterplate $b$ respectively.

To effect a declutching operation, the counterplate $b$ is shifted to the right by levers $h$, which are pivotally mounted at $i$ under the effect of a thrust exerted in a leftward direction by a thrust bearing D which bears directly on the levers $h$ and is supported by the clutch fork F.

It comprises two rolling plates 1, 2 between which is inserted a cage 6 having rolling elements or needles 5, these plates constituting races for the needles and being connected respectively to a disc 14 constituting a hub and to a lubricant housing 8 which has a radial wall 30 inserted in a sealed manner in a groove 16 formed between the rolling plate 1 and the disc 14. Thus the plate 2 and the housing 8 constitute a first race-carrying element and the plate 1 and the disc 14 a second race-carrying element. The other radial wall 19 of the housing comprises a median inner annular projecting portion 19a which is located substantially on a circle corresponding to the mean circle of the path of movement of the rolling elements and is plane over a length less than the length of the rolling elements, a portion 19b which radially outwardly extends from the portion 19a and is slightly offset, that is, spaced away from the plate 2 carrying the race for the rolling elements, and a portion 19c which radially inwardly extends from the portion 19a and forms an annular projection having a generally toric configuration and adapted to bear against the plane ends 20 of the declutching levers $h$. Following on the projection 19c, the front radial wall 19 of the housing 8 includes a flange 19d which extends axially in the region of the needles 5 and radially in a portion 19e. Slidable on the cylindrical flange 19d is the cylindrical portion 90a of a sealing ring 90 which has an L-shaped cross-section and a radial portion 90b which rubs on its periphery on the race 3 for the needles 5 or on an extension of this race.

The disc 14 of the thrust bearing B is pivoted by two bosses 54 on the concave free end portions of the branches 55 of the fork F which is pivoted to the support G by means of a swivel joint 56 which is formed on one end of a pin 57 fitted at 57a in the support and is applied in a complementary part-spherical cavity 58 in the fork by a spring 59 having two branches 60. This spring bears against a flange 61 of the swivel joint and is anchored in the fork on both sides of this swivel mounting at its end at 62 and at its top end at 63 (FIGS. 3 and 4). Thus, the fork is pivotable about a main axis Y—Y which is horizontal and perpendicular to the axis X—X of rotation of the clutch system and about a secondary axis which practically coincides with the longitudinal axis Z—Z of the fork. However, the rotation of the fork about an axis parallel to the axis X—X is prevented owing to the contact of the branches 60 of the spring 69 with two flat faces 64 formed on a portion 57b of the pin 57 intermediate the flange 61 and the portion 57a.

The greasing or lubrication of the swivel joint ball 56 is achieved by a lubricant retained by a member 66 applied in a sealed manner against the ball and against the edges of the part-spherical cavity 58.

When declutching by exerting a traction on the cable 67 secured to the lower end of the fork F, the thrust bearing D moves thorugh a curved path which requires a relative radial displacement of the plates 1 and 2 allowing the self-centering to occur. This radial displacement is allowed owing to the provision of the radial and axial clearances (seen in the drawing) on one hand, between the cylindrical parts of the palte 1 and the housing 8, and, on the other, between the radial wall 30 and the adjacent face of the disc 14.

FIG. 1 shows the clutch system at the moment when a declutching operation starts, that is, at the moment when the housing 8 and the rolling plate 2 connected thereto are centered on the axis X—X owing to the effect of the low load contact between the convex surface 19c of the housing and the end 20 of the declutching levers $h$. The remainder of the declutching operation maintains this initial centering, there being a possibility of a radial displacement of the plate 1 relative to the needles 5.

It will be observed that in the zone of the sealing ring 90, centrifugal force normally puts the lubricant under a negative pressure or suction so that the latter only temporarily tends to escape toward the centre under the dynamic effects due to the relative radial displacements of the plate 1 and housing 8. Under these conditions the mass of lubricant undergoing a movement toward the center which reaches the zone formed by the plate 2 and the two branches or portions 90a, 90b of the sealing ring 90, tends to urge the radial portion 90b of the plate 2 away and this insures that the branch 90b contacts the plate 3 or the extension thereof. Consequently, a seal is obtained.

However, it is possible to obtain a sealing contact of the ring with the race 3 independently of the aforementioned dynamic effects and a possible increase in the pressure of contact. This is the object of the embodiments shown in FIGS. 5–8.

In FIG. 5, the ring 90 has a U-shaped section and has in addition to the branch 90b in contact with the race 3 a branch 90c resiliently applied at 19f against the radial wall 9. This branch 90c can be continuous or, as shown, in the form of tabs having a certain resilience.

In the embodiment shown in FIG. 6, the seal obtained between the branch 90b in contact with the race 3 is improved by the presence of a groove 91.

In the embodiment of the thrust bearing shown in FIG. 7, the plate 2 has been eliminated and the rolling elements 5 roll directly on a portion 19a which is no longer plane but very slightly crowned. Further, the portions 19b and 19c have been reversed, namely, the portion 19c having a generally toric shape is located on the outside, the offset portion 19b being on the inside relative to the median portion 19a. The portion 19c bears against the levers h when declutching. As concerns the flange 19d, it has a frusto-conical shape and there is provided between the inner face of this flange and the plate 1 a sealing ring 92 which has a solid V-shaped cross-section whose corresponding faces are respectively applied against the inner face of the flange 19d and the race 3. To insure both the circumferential resilience and the radial seal, the ring 92 can be in the form of piston rings that is, it can be split and have ends 92a and 92b in overlapped relation (FIG. 8).

FIGS. 9 and 10 show an embodiment of the control fork. In this embodiment the ball part of the swivel joint 72 is formed in the fork F and held in contact with a complementary part-spherical surface 71 formed on a boss 70 of the support G by means of a U-shaped spring 73 whose free ends 74 are anchored in the upper part of the fork. The spring bears by its branches on a horizontal pin 75 extending through the boss 70 and by its intermediate branch 76 on a horizontal abutment surface 77 on the support. The latter support prevents any rotation about an axis parallel to the axis X—X of the clutch system. Further, the spring 73 prevents the fork, when it is not actuated, from accidentally turning about an axis parallel to its longitudinal direction.

In the embodiment shown in FIGS. 11 and 12, the fork F is pivoted to the support by a horizontal pin (not shown) but the thrust bearing B is pivotable about two perpendicular axes, namely a first axis parallel to the axis of said horizontal pin of the fork and perpendicular to the plane of FIG. 11 and a second axis perpendicular to said horizontal pin of the fork and contained in the plane of FIG. 11. These two axes are embodied by semicylindrical bearing surfaces 80, 80 and 81, 81 which are formed in a universal joint assembly 82 having a cylindrical shape and which cooperate with complementary surfaces 80a, 80a and 81a, 81a formed on the branches of the fork and on the disc 14 of the thrust bearing D respectively. Springs 83 of substantially U-shaped pinching type afford a connection between the assembly 82 and the adjacent elements while allowing the desired relative movements.

Although specific embodiments of the invention have been described, many modifications and changes may be made therein without departing from the scope of the invention as defined in the appended claims.

Thus, the ring 90 shown in FIGS. 1 and 2 could be urged into contact with the race 3 by a magnetization of the ring itself and/or of the plate 1. Similarly, the quality of the contact of the sliding surfaces, such as those of the branch 90b of the ring 90 can be improved by a surface treatment, for example phosphating. It will be observed that the various embodiments of the sealing ring 90 could be employed independently of the constructional features of the housing 8 with which they have been illustrated.

Having now described my invention what I claim as new and desire to secure by Letters Patent is:

1. In a clutch release system comprising a first shaft having an axis of rotation, a second shaft, a clutch interposed between the shafts and declutching levers or the equivalent mounted on the clutch, an assembly consisting of a support, a declutching fork contained in a plane containing said axis of rotation of the first shaft, the fork having two branches located repectively on opposite sides of said plane, means pivotally mounting the fork on the support so that the fork is pivotable in said plane toward the levers for declutching, a thrust rolling bearing interposed between the levers and the branches of the fork, and encompassing the first shaft in floating relation to the first shaft and movable axially of the first shaft between a clutching position and a declutching position, the bearing comprising: a first race-carrying element and a second race-carrying element which are relatively rotatable and relatively radially movable, the first element having an annular projecting portion integral with and projecting from the first element toward the declutching levers, said projecting portion being in direct engagement with the levers in said declutching position of the bearing, means operatively and pivotally connecting the second element to the branches of the fork so that the second element is pivotable about a first axis substantially perpendicular to said plane and substantially intersecting said axis of rotation and means whereby the thrust bearing is free when declutching to pivot relative to the fork about a second axis substantially contained in said plane and substantially parallel to the plane of the annular projection portion and the thrust exerted by the declutching fork on the thrust bearing when declutching acts in said plane of the fork.

2. In a clutch release system comprising a first shaft having an axis of rotation and a second shaft, a clutch interposed between the shafts and declutching levers or the equivalent mounted on the clutch, an assembly consisting of a support, a declutching fork contained in a plane containing said axis of rotation of the first shaft, the fork having two branches located respectively on opposite sides of said plane, means pivotally mounting the fork on the support so that the fork is pivotable in said plane towards the levers for declutching, a thrust rolling bearing interposed between the levers and the branches of the fork and encompassing the first shaft in floating relation to the first shaft and movable axially of the first shaft between a clutching position and a declutching position, the bearing comprising: a first race-carrying element and a second race-carrying element which are relatively rotatable and relatively radially movable, the first element being a composite element and comprising a housing for containing lubricant for the bearing and a plate which is fixed inside the housing and has a face constituting a race for the bearing, the housing having an annular projecting portion integral with and projecting from the first element toward the declutching levers, said projecting portion being in direct engagement with the levers in said declutching position of the bearing, means operatively and pivotally connecting the second element to the branches of the fork so that the second element is pivotable about a first axis perpendicular to said plane and substantially intersecting said axis of rotation and means whereby the thrust bearing is free when declutching to pivot relative to the fork about a second axis substantially contained in said plane and substantially parallel to the plane of the annular projecting portion and the thrust exerted by the declutching fork on the thrust bearing when declutching acts in said plane of the fork.

3. In a clutch system having a driving shaft and a driven shaft, a clutch interposed between the shafts and declutching levers or the equivalent mounted on the clutch, the assembly consisting of a support, a declutching fork mounted on the support to pivot in a plane for declutching and having a free end portion, a thrust rolling bearing interposed between the levers and the free end portion of the fork and encompassing the driven shaft in floating relation to the driven shaft and movable axially of the driven shaft between a clutching position and a declutching position, the bearing comprising: a first race-carrying element and a second race-carrying element which are relatively rotatable and relatively radially movable, the first element being a composite element and comprising a housing for containing lubricant for the bearing and a plate which is fixed inside the housing and has a face constituting a race for the bearing, the housing having an annular projection adjacent the levers, which is in direct engagement with the levers in said declutching position of the bearing, and means operatively and pivotally connecting the second element to the free end portion of the fork and means for insuring a freedom of orientation of the plane of said annular projection relative to the declutching levers about a secondary axis which is substantially parallel to the plane of said annular projection and contained in said pivot plane of the fork, said assembly comprising rolling elements engaged between the first element and second element, said housing having a radially extending wall interposed between the first element and the levers and a flange on said wall which extends in the region of said rolling elements inside the bearing, a sealing ring being interposed between and in sealing contact with said flange and said second element with respect to which the housing is movable.

4. The assembly as claimed in claim 2, comprising rolling elements engaged between the first element and second element, said housing having a radially extending wall which is interposed between the first element and the levers and has an axially inwardly projecting portion having an annular radially extending plane face in abutting relation to the plate, the rest of said radially extending wall being spaced away from said plane and the radial extent of said plane face being a fraction of the length of the rolling elements.

5. In a clutch release system comprising a first shaft having an axis of rotation and a second shaft, a clutch interposed between the shaft and declutching levers or the equivalent mounted on the clutch, an assembly consisting of a support, a declutching fork contained in a plane containing said axis of rotation of the first shaft, the fork having two branches located respectively on opposite sides of said plane, means pivotally mounting the fork on the support so that the fork is pivotable in said plane toward the levers for declutching, a thrust rolling bearing interposed between the levers and the branches of the fork and encompassing the driven shaft in floating relation to the driven shaft and movable axially of the driven shaft between a clutching position and a declutching position, the bearing comprising: a first race-carrying element and a second race-carrying element which are relatively rotatable and relatively radially movable and rolling elements engaged between the first and second elements, the first element being both a bearing ring having a face constituting a race and a housing for containing lubricant for the bearing, the first element having an annular projecting portion integral with and projecting from the first element axially toward the declutching levers, said projecting portion being adjacent the levers and in direct engagement therewith in said declutching position of the bearing, means operatively and pivotally connecting the second element to the branches of the fork so that the second element is pivotable about a first axis perpendicular to said plane and substantially intersecting said axis of rotation, and means whereby the thrust bearing is free when declutching to pivot relative to the fork about a second axis substantially contained in said plane and substantially parallel to the plane of the annular projecting portion and the thrust exerted by the declutching fork on the thrust bearing when declutching acts in said plane of the fork, the first element further comprising an inner annular crowned portion in contact with the rolling elements so as to avoid overloads at the ends of the rolling elements.

6. The assembly as claimed in claim 5, further comprising a flange on said housing which extends in the region of said rolling elements inside the bearing, a sealing ring interposed between and in sealing contact with said flange and said second element.

7. In a clutch release system comprising a first shaft having an axis of rotation and a second shaft, a clutch interposed between the shafts and declutching levers or the equivalent mounted on the clutch, an asesmbly consisting of a support, a declutching fork mounted on the support to pivot in a plane containing said axis of rotation of the first shaft for declutching and having a free end portion, a thrust rolling bearing interposed between the levers and the free end portion of the fork and encompassing the driven shaft in floating relation to the driven shaft and movable axially of the driven shaft between a clutching position and a declutching position, the bearing comprising: a first race-carrying element and a second race-carrying element which are relatively rotatable and relatively radially movable, the first element having an annular projecting portion integral with and projecting from the first element toward the declutching levers, said projecting portion being adjacent the levers in said declutching position of the bearings, first means operatively and pivotally connecting the second element to the free end portion of the fork so that the second element is pivotable about a first axis substantially perpendicular to said plane of the fork and substantially intersecting said axis of rotation, and second means whereby the thrust bearing is free when declutching to pivot relative to the fork about a second axis substantially contained in said plane and substantially parallel to the plane of the annular projecting portion and the thrust exerted by the declutching fork on the thrust bearing when declutching acts in said plane of the fork, said second means comprising a ball joint in said plane of the fork and pivotally mounting the fork on the support, which allows not only a normal pivotal movement in said plane of the fork for declutching but also an auxiliary pivotal movement about said second axis and an auxiliary system interposed between the fork and the support for preventing an angular movement of the fork about an axis parallel to said axis of rotation of the first shaft.

8. In a clutch release system comprising a first shaft having an axis of rotation, a second shaft, a clutch interposed between the shafts and declutching levers or the equivalent mounted on the clutch, an assembly consisting of a support, a declutching element mounted on the support to pivot in a plane containing said axis of rotation for declutching and having a free end portion, a thrust rolling bearing interposed between the levers and the free end portion of the declutching element, and encompassing the first shaft in floating relation to the first shaft and movable axially of the first shaft between a clutching position and a declutching position, the bearing comprising: a first race-carrying element and a second race-carrying element which are relatively rotatable and relatively radially movable, the first element having an annular projecting portion integral with and projecting from the first element toward the declutching levers, said projecting portion being in direct engagement with the levers in said declutching position of the bearing, and a universal joint connecting the second element to the free end portion of the declutching element, the universal joint having two pivot axes intersecting said axis of rotation of the first shaft.

9. The assembly as claimed in claim 6, further comprising stop means for limiting the amplitude of the pivotal movement of the annular projecting portion about the second axis.

References Cited by the Examiner

UNITED STATES PATENTS

| | | | |
|---|---|---|---|
| 1,424,036 | 7/1922 | Ross | 192—98 X |
| 2,133,053 | 10/1938 | Kelley | 192—99 X |
| 2,319,123 | 5/1943 | Frank | 192—99 |
| 2,359,364 | 10/1944 | Katcher | 192—98 |
| 2,555,929 | 6/1951 | Jensen et al. | 192—104 |
| 3,009,554 | 11/1961 | Frank | 192—99 |

FOREIGN PATENTS 843,528   8/1960   Great Britain.

DAVID J. WILLIAMOWSKY, *Primary Examiner.*

DON A. WAITE, *Examiner.*

B. W. WYCHE III, *Assistant Examiner.*